US012453982B2

(12) United States Patent
Rönnfeldt

(10) Patent No.: US 12,453,982 B2
(45) Date of Patent: Oct. 28, 2025

(54) EXTINGUISHING NOZZLE ADAPTER FOR FITTING AN EXTINGUISHING NOZZLE TO A WALL, AND FIRE-FIGHTING SYSTEM COMPRISING SAID EXTINGUISHING NOZZLE ADAPTER

(71) Applicant: Minimax Viking Patent Management GmbH, Bad Oldesloe (DE)

(72) Inventor: Frank Rönnfeldt, Sühlen (DE)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 798 days.

(21) Appl. No.: 17/614,112

(22) PCT Filed: Jun. 8, 2020

(86) PCT No.: PCT/EP2020/065789
§ 371 (c)(1),
(2) Date: Jul. 14, 2022

(87) PCT Pub. No.: WO2020/245451
PCT Pub. Date: Dec. 10, 2020

(65) Prior Publication Data
US 2022/0355328 A1 Nov. 10, 2022

(30) Foreign Application Priority Data
Jun. 6, 2019 (DE) .................... 10 2019 115 392.1

(51) Int. Cl.
*B05B 15/74* (2018.01)
*A62C 3/00* (2006.01)
*A62C 35/68* (2006.01)

(52) U.S. Cl.
CPC .............. *B05B 15/74* (2018.02); *A62C 3/006* (2013.01); *A62C 35/68* (2013.01)

(58) Field of Classification Search
CPC ......... B05B 15/70; B05B 15/72; B05B 15/74; A62C 3/006; A62C 31/005; A62C 31/02;
(Continued)

(56) References Cited

U.S. PATENT DOCUMENTS 10,933,268 B2 * 3/2021 Huotari .................. A62C 37/09
2005/0161008 A1 * 7/2005 Sundholm .......... F02M 25/0225 123/25 A
(Continued)

FOREIGN PATENT DOCUMENTS

CN 106621144 A * 5/2017 ............ A62C 31/02
DE 69221149 T 2/1998
(Continued)

OTHER PUBLICATIONS

English language translation of CN-106621144-A; Gao; Published May 10, 2017.*
(Continued)

*Primary Examiner* — Darren W Gorman
(74) *Attorney, Agent, or Firm* — Perkins Coie LLP

(57) ABSTRACT

The invention relates to an extinguishing nozzle adapter for mounting an extinguishing nozzle on a wall, having a housing and a chamber for receiving an extinguishing nozzle, wherein the housing has an extinguishing agent connection to the chamber, via which connection the chamber is able to be pressurized with extinguishing agent, wherein the chamber is designed to receive the extinguishing nozzle in a movable manner such that the extinguishing nozzle is movable back and forth between a first, retracted position and a second, advanced position, and is moved in the direction of the advanced position when the chamber is pressurized by means of the extinguishing agent.

17 Claims, 8 Drawing Sheets

(58) Field of Classification Search
CPC ......... A62C 31/05; A62C 35/68; A62C 37/09; A62C 37/20
See application file for complete search history.

(56) References Cited

U.S. PATENT DOCUMENTS

| | | | |
|---|---|---|---|
| 2016/0303591 | A1 | 10/2016 | Posner et al. |
| 2022/0355315 | A1 | 11/2022 | Rönnfeldt et al. |
| 2023/0044995 | A1 | 2/2023 | Rönnfeldt et al. |

FOREIGN PATENT DOCUMENTS

| | | | | |
|---|---|---|---|---|
| DE | 19823085 | | 9/1999 | |
| EP | 1537918 | | 6/2005 | |
| WO | WO93/00962 | | 1/1993 | |
| WO | WO-2004075995 | A1 * | 9/2004 | ............. A62C 31/02 |
| WO | WO2004/091727 | | 10/2004 | |
| WO | WO-2016083658 | A1 * | 6/2016 | ............. A62C 37/09 |

OTHER PUBLICATIONS

International Searching Authority, International Search Report with English translation, International Application No. PCT/EP2020/065789, 5 pages; Aug. 3, 2020.
International Searching Authority, Written Opinion with English translation, International Application No. PCT/EP2020/065789, 12 pages; Aug. 3, 2020.

* cited by examiner

EXTINGUISHING NOZZLE ADAPTER FOR FITTING AN EXTINGUISHING NOZZLE TO A WALL, AND FIRE-FIGHTING SYSTEM COMPRISING SAID EXTINGUISHING NOZZLE ADAPTER

PRIORITY CLAIM AND INCORPORATION BY REFERENCE

This application is a 35 U.S.C. § 371 application of International Application No. PCT/EP2020/065789, filed Jun. 8, 2020, which claims the benefit of German Application No. 10 2019 115 392.1, filed Jun. 6, 2019, each of which is incorporated by reference in its entirety.

TECHNICAL FIELD

The present invention relates to an extinguishing nozzle adapter for mounting an extinguishing nozzle on a wall. In particular, the invention relates to such an extinguishing nozzle adapter for mounting on a wall of a space from outside the space, wherein the wall has a corresponding recess for receiving the extinguishing nozzle, in order to introduce extinguishing agent into the space through the wall recess.

BACKGROUND AND SUMMARY OF THE INVENTION

It is frequently necessary or desirable to lay the extinguishing agent supply from extinguishing nozzles to a space such that the extinguishing agent supply itself runs outside the space. However, the extinguishing nozzles have to be arranged at least with their extinguishing agent outlets such that they can also supply the interior of the space with extinguishing agent. For this reason, the extinguishing nozzles usually extend entirely or at least partially inside the space However, mounting inside the space from the inside is difficult in particular when the space is confined and in particular when the space is a duct, for example an extractor duct for gaseous mixtures of substances, for example ambient air or cooking vapors, etc. Therefore, depending on the spatial conditions in corresponding spaces, use is made of the option of mounting the extinguishing nozzles on the wall from outside such that the extinguishing nozzle can extend into the space through a corresponding recess in the wall.

For this purpose, solutions are well known. However, the known solutions have the common drawback that the extinguishing nozzle in the mounted state has a fixed arrangement in which it extends at least partially inside the space and protrudes into the space. This means that the extinguishing nozzle itself represents a flow obstacle for air in the space. The more confined the space, the more apparent this is. In particular when it is desirable to have unimpaired circulation of the gaseous mixture of substances in the space, for example in ducts through which flow takes place, there is therefore a need for an improvement to the existing manners of attachment.

Consequently, the invention was based on the object of specifying an extinguishing nozzle adapter of the type set out at the beginning, which overcomes the above-described drawbacks as far as possible.

The invention achieves the object on which it is based in the case of such an extinguishing nozzle adapter in that it has a housing, and a chamber for receiving an extinguishing nozzle, wherein the housing has an extinguishing agent connection to the chamber, via which connection the chamber is able to be pressurized with extinguishing agent, wherein the chamber is designed to receive the extinguishing nozzle in a movable manner such that the extinguishing nozzle is movable back and forth between a first, retracted position and a second, advanced position, and is moved in the direction of the advanced position when the chamber is pressurized by means of the extinguishing agent.

The invention follows the approach that the extinguishing nozzle only needs to extend into the space when it is also intended to extinguish. For the vast majority of the time, in practice, in which the extinguishing nozzle remains inactive, its presence inside the space is not necessary. The invention draws on this and allows the extinguishing nozzle to take up less spatial volume down to preferably no spatial volume at all in the retracted position, while it projects further into the space in the advanced position and can discharge extinguishing agent directly into the space.

According to the invention, to move the extinguishing nozzle from the retracted position into the advanced position, the pressure of the extinguishing agent in the chamber itself is used. Therefore, an additional driving force, for example an electrical or pneumatic driving force, is not necessary in order to move the nozzle into the advanced position. As soon as extinguishing agent passes into the chamber, the extinguishing agent pressure ensures that the extinguishing nozzle is pressurized in the direction of the advanced position.

The invention is advantageously developed in that the extinguishing nozzle adapter has a return spring which is operatively connected to the extinguishing nozzle and is designed to exert a restoring force in the direction of the retracted position on the extinguishing nozzle. Preferably, the return spring is arranged between the extinguishing nozzle and a corresponding seat in the housing of the extinguishing nozzle adapter.

Preferably, the return spring is designed to exert a restoring force at least when the extinguishing nozzle is deflected from the retracted position in the direction of the advanced position. Particularly preferably, the return spring is preloaded such that it also exerts a spring force on the extinguishing nozzle in the direction of the retracted position when the extinguishing nozzle is in the retracted position, such that, in order to deflect the extinguishing nozzle in the direction of the advanced position, the preloading force of the spring has to be overcome first.

By choosing the right restoring force by means of the return spring, a threshold pressure can be defined that has to be overcome before the extinguishing nozzle is advanced in the direction of the advanced position. Particularly preferably, the restoring force is selected such that the threshold pressure lies in a range from 0.5 to 5 bar, particularly preferably in a range from 1 bar to 4 bar.

More preferably, the chamber has an extinguishing-nozzle-side end and a cover arranged at that end, said cover being designed to close the chamber when the extinguishing nozzle is in the retracted position and to open up the chamber when the extinguishing nozzle is in the advanced position.

The cover is preferably arranged in the form of one or more covering elements on the housing so as to be pivotable between a closed position and an open position, wherein the extinguishing nozzle is designed to force the cover from the closed position into the open position during its own movement in the direction of the advanced position, and wherein more preferably a cover restoring element is operatively connected to the cover and is designed to exert a restoring force in the direction of the closed position on the cover.

Alternatively, the cover is preferably designed to be fastened to the extinguishing nozzle, and preferably has at least one cutout for an extinguishing agent outlet of the extinguishing nozzle. In this configuration, the cover is carried along by the extinguishing nozzle when the latter is shifted in the direction of the advanced position. Extinguishing agent can leave the extinguishing agent outlet in an unimpeded manner through the cutout in the extinguishing nozzle and can supply the space with extinguishing agent.

In a further preferred embodiment, a movable piston is arranged in the chamber, said piston being designed to be coupled to an extinguishing agent inlet of the extinguishing nozzle and having a passage opening in order to fluidically connect the extinguishing nozzle to the chamber. The coupling between the extinguishing nozzle and piston can take place indirectly via one or more connecting elements, or directly, for example by the extinguishing nozzle being screwed into the piston. The active face of the piston is preferably an end face in which the passage opening is arranged.

In a preferred configuration, the chamber has an inner wall surface along which the piston is slidably guided, wherein preferably a sealing element is arranged between the piston and the chamber wall.

In a further preferred embodiment, the return spring is connected to the housing on one side and to the piston on the other side. The return spring is preferably connected to a piston-side seat which is formed on a side facing away from the active face of the piston.

In a more preferred embodiment, the housing is configured in a multipart manner and has preferably a first housing part that has an extinguishing agent connection for introducing extinguishing agent into the chamber, and a second housing part that has the cover.

Preferably, the second housing part has a mounting interface for fastening the extinguishing nozzle adapter to the wall. The mounting interface can be formed for example as a mounting flange or some other hole pattern.

In a further preferred embodiment, the housing has a third housing part, which has the inner wall surface for guiding the piston. The advantage of the multipart configuration of the housing is mainly that the component complexity for each individual component drops in each case and machining steps, for example the dimensionally accurate production of the guide face for the piston, can be carried out on a respectively smaller component, this improving handling during production.

In a further preferred embodiment, a positioning element is arranged on the housing, preferably at the mounting interface, said positioning element being representative for the orientation of the extinguishing nozzle inside the housing. Alternatively or in addition, the housing has a first form-fitting element, for example a groove, for cooperating with a corresponding second form-fitting element on the extinguishing nozzle, for example a protrusion protruding laterally from the extinguishing nozzle.

This ensures that the extinguishing nozzle can be mounted only in a predetermined orientation in the housing. Since the positioning element defines the orientation of the housing relative to the wall, the orientation of the nozzle is also immediately apparent to the fitter, and so the risk of an incorrect orientation of the nozzle within the duct is averted. This is relevant in particular when, as provided according to the invention, the extinguishing nozzle is intended to be mounted on the wall from outside the space. Using the positioning method according to the invention, it is possible to dispense with inspecting the inside of the space.

The invention was described above on the basis of a first aspect with regard to the extinguishing nozzle adapter directly. In a further aspect, the invention relates to a firefighting system for firefighting in a space bounded by a wall, having one or more extinguishing nozzles, which have been mounted in recesses in the wall from outside the space and are designed to introduce extinguishing agent into the space through the wall recesses.

In such a firefighting system, the invention achieves the object set out at the beginning in that one, several or all of the extinguishing nozzles have been mounted on the wall by means of an extinguishing nozzle adapter which is configured in accordance with one of the above-described preferred embodiments. In particular, the extinguishing nozzle adapter has a housing and a chamber in which an extinguishing nozzle is received, wherein the housing has an extinguishing agent connection to the chamber, via which connection the chamber is able to be pressurized with extinguishing agent, wherein the extinguishing nozzle is movable back and forth between a first, retracted position and a second, advanced position, and is moved in the direction of the advanced position when the chamber is pressurized by means of the extinguishing agent.

The preferred embodiments of the extinguishing nozzle adapter according to the invention are at the same time preferred embodiments of the firefighting system and vice versa. To avoid repetition, reference is made to the above information in this regard.

The space that is protected by means of the firefighting system is preferably a duct, particularly preferably an extractor duct for gaseous mixtures of substances, for example ambient air and/or cooking fumes. On account of the confined spatial conditions in ducts, the option of reliably attaching the extinguishing nozzle is particularly beneficial when, as provided according to the invention, it does not have any influence on the flow in the space in the retracted position and can discharge extinguishing agent into the space optimally in the advanced position.

Moreover, according to one of the above-described preferred embodiments, incorrect mounting is largely precluded using positioning elements, and so the firefighting system can be put into operation with less effort and at the same time greater reliability against malfunctioning.

BRIEF DESCRIPTION OF THE DRAWINGS

The invention is described in more detail in the following text on the basis of preferred exemplary embodiments with reference to the accompanying figures, in which.

MODE(S) FOR CARRYING OUT THE INVENTION

Where identical reference signs are used in the different exemplary embodiments, these relate to structurally or functionally identical elements. To avoid repetition, reference is made to the respective descriptions of the other figures.

FIGS. 1*a-e* show an extinguishing nozzle adapter 1 according to a first preferred exemplary embodiment of the invention. The extinguishing nozzle adapter 1 has a housing 3, which is designed to be mounted on a wall of a space. A cover 5 is pivotably arranged on the housing. A cover restoring element 6 is preferably arranged between the housing 3 and the cover 5 and is designed to return the cover 5 into the closed position shown in FIG. 1*a*, if it is deflected.

Figure 1A:
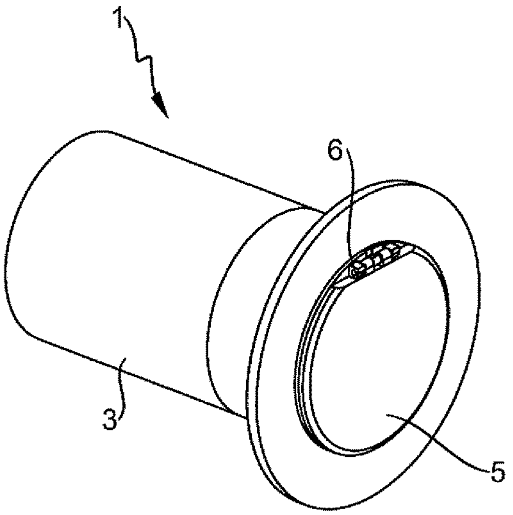
FIGS. 1*a-e* show an extinguishing nozzle adapter according to a first exemplary embodiment, FIGS. 2*a, b* show an extinguishing nozzle adapter according to a second exemplary embodiment.
Figure 1B:
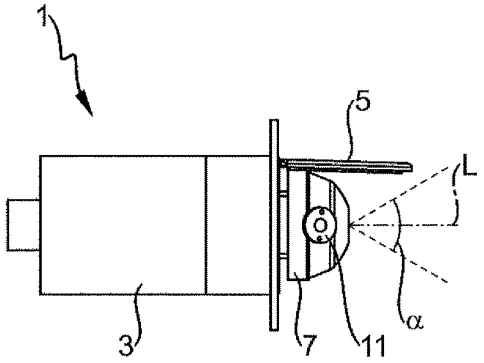
Figure 1C:
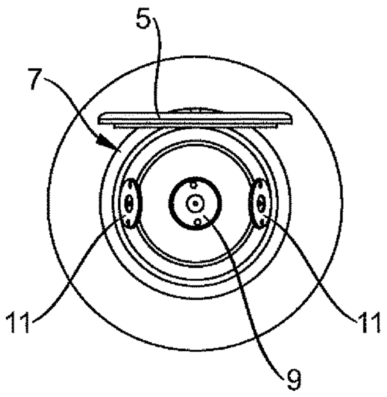

FIG. 1*b* shows the extinguishing nozzle adapter 1 with the cover 5 open. Here, the extinguishing nozzle 7 inserted in the extinguishing nozzle adapter 1 is apparent, said extinguishing nozzle 7 being in an advanced end position in which it would extend in a mounted state into the space to be extinguished. The extinguishing nozzle 7 is guided so as to be movable lengthwise along a longitudinal axis L in the housing 3 of the extinguishing nozzle adapter 1, see FIG. 1*d*. The extinguishing nozzle 7 has a first extinguishing agent outlet 9 and two second extinguishing agent outlets 11, see FIG. 1*c*, of which the first extinguishing agent outlet 9 extends parallel to, in particular coaxially with, the longitudinal axis L, while the two second extinguishing agent outlets 11 extend at an angle to the longitudinal axis L. Extinguishing agent passes out of the extinguishing agent outlets 9, 11 in a region characterized by an opening angle $\alpha$. The advanced position of the extinguishing nozzle 7 is preferably chosen such that the extinguishing agent output in the region of the angle $\alpha$ is not disturbed by the cover 5.

Figure 1D:
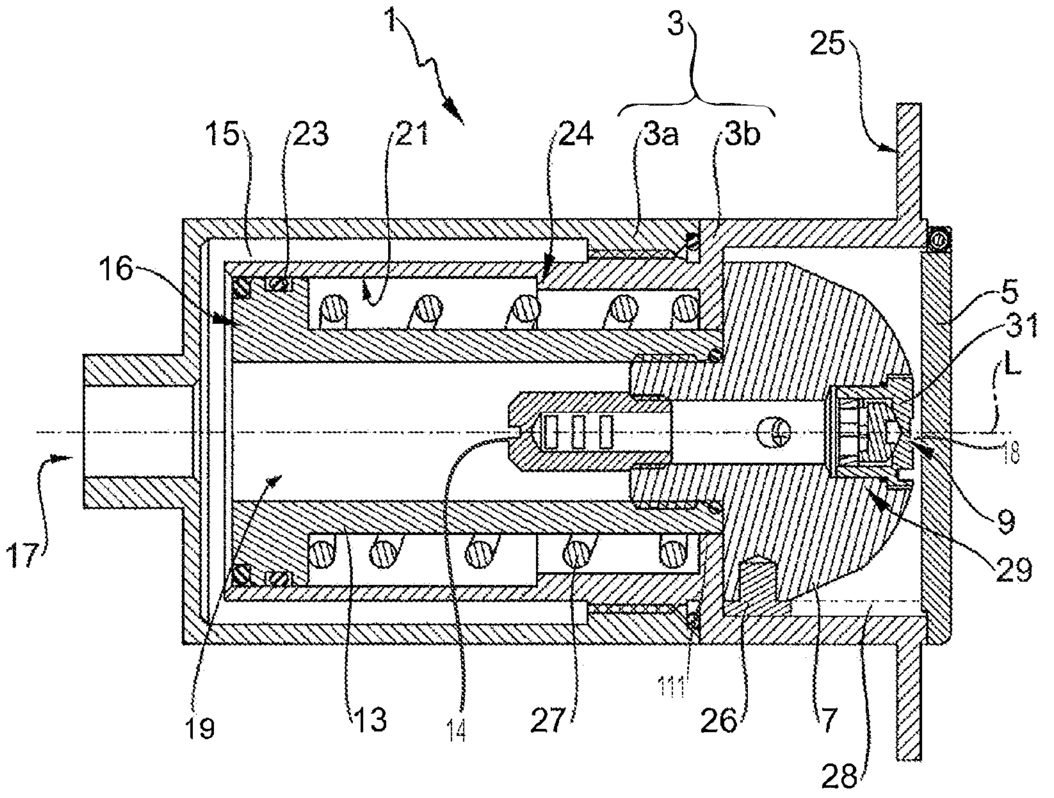

In FIG. 1*d*, the extinguishing nozzle adapter 1 is shown with the extinguishing nozzle 7 in its retracted position.

Arranged inside the housing 3 is a piston 13, which slides movably along an inner wall surface 21 in a manner guided in the direction of the longitudinal axis L.

The piston 13 and the inner wall surface 21 are arranged in a chamber 15 of the housing 3, which is fluidically connected to an extinguishing agent connection 17 such that pressurized extinguishing agent can flow through the extinguishing agent connection 17 into the chamber 15. The extinguishing agent, on flowing into the chamber 15, comes into contact with an active face 16 of the piston 13, with the result that a force is exerted on the piston in the direction of the advanced position (FIG. 1*b*). Arranged opposite the extinguishing agent inlet 14, at an extinguishing-nozzle-side end 18, is the cover 5, which is displaced by the extinguishing nozzle 7.

The piston 13 is provided with a passage opening 19 via which the pressurized fluid can also flow into the extinguishing nozzle 7 and is conveyed from there to the extinguishing agent outlets 9, 11.

The piston 13 is slidably guided along the inner wall 21 in the chamber 15 in a fluidtight manner by means of a sealing element 23.

Arranged between the piston 13 and the housing 3 is a return spring 27. The return spring 27 is designed to move the piston 13 in the direction of the retracted position (FIG. 1*d*). The retracted position is defined by the abutment of the extinguishing nozzle 7 against the housing 3. The advanced position of the extinguishing nozzle 7 is defined by a stop 24 against which the piston 13 comes to bear in its advanced position.

The housing 3 is constructed in two parts and comprises a first housing part 3*a*, which has the extinguishing agent outlet 17, and a second housing part 3*b*, which has the cover 5. Also formed on the second housing part 3*b* is a mounting interface 25 in the form of a flange ring. By means of the mounting interface 25, the extinguishing nozzle adapter is mounted on a wall of a space.

The extinguishing nozzle 7 and the housing 3 are preferably coupled together via corresponding form-fitting elements 26, 28 such that the extinguishing nozzle 7 is mounted on the housing 3 in a predetermined orientation relative thereto. More preferably, a marking 110 or a similar positioning element (not illustrated), via which a fitter can determine the orientation of the extinguishing nozzle adapter 1, is applied to the outside of the housing 3 at the mounting interface 25 or some other point. On account of the form-fitting coupling between the extinguishing nozzle 7 and housing 3, with regard to a rotational position of the extinguishing nozzle 7 about the longitudinal axis L, the orientation of the extinguishing nozzle 7 itself can be defined at the same time via the positioning element on the outside of the extinguishing nozzle adapter, this minimizing or even precluding the risk of incorrect installations.

The extinguishing agent outlets 9, 11 of the extinguishing nozzle 7 are provided in the form of nozzle inserts 31, which have been let into corresponding recesses 29 in the extinguishing nozzle 7.

Depending on the application, different or identical inserts 31 can be screwed into the recesses 29 in the extinguishing nozzle 7 in order to exert a desired discharging characteristic of the extinguishing nozzle 7 in the space on which it acts.

In this connection, the correct positioning of the extinguishing nozzle 7 gains additional relevance, or the particular advantage of the clear positionability of the extinguishing nozzle 7 in the housing 3 becomes apparent.

Figure 1E:
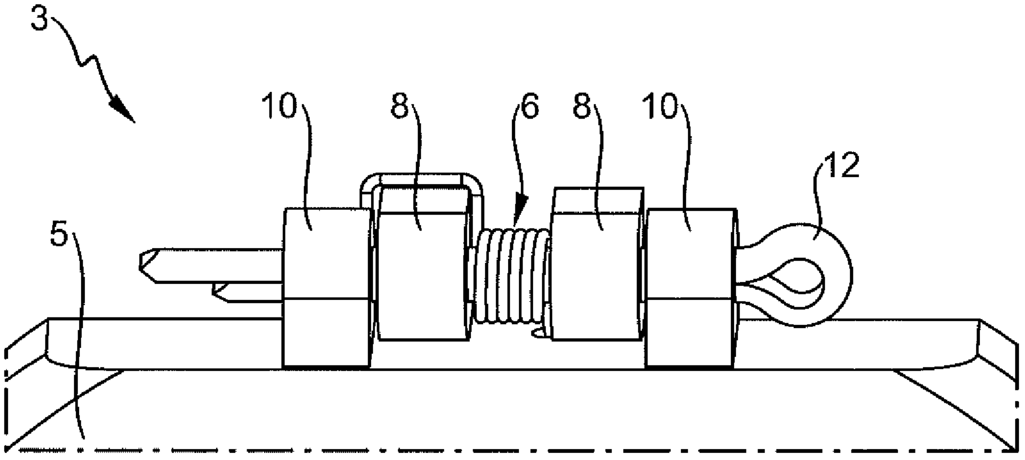

FIG. 1*e* shows a detail view of the cover restoring element 6 on the outer side of the housing 3. The housing 3 has one or more knuckles 8 and the cover 5 has corresponding knuckles 10. The cover 5 and the housing 3 are coupled together by means of a hinge pin 12 that passes through the knuckles 8, 10. Preferably, the restoring element 6 in the form of a torsion spring is arranged between two adjacent knuckles 8. The restoring element 6 allows the housing 3 or the extinguishing nozzle adapter 1 to be installed in any desired orientation without it being necessary to make allowances for gravity. The cover 5 will then be kept closed by the restoring spring 6 when it is mounted vertically, horizontally or overhead, provided no extinguishing agent pressure prevails in the chamber 15, or the prevailing extinguishing agent pressure is at least not capable of overcoming the restoring force exerted by the return spring.

Figure 2A:
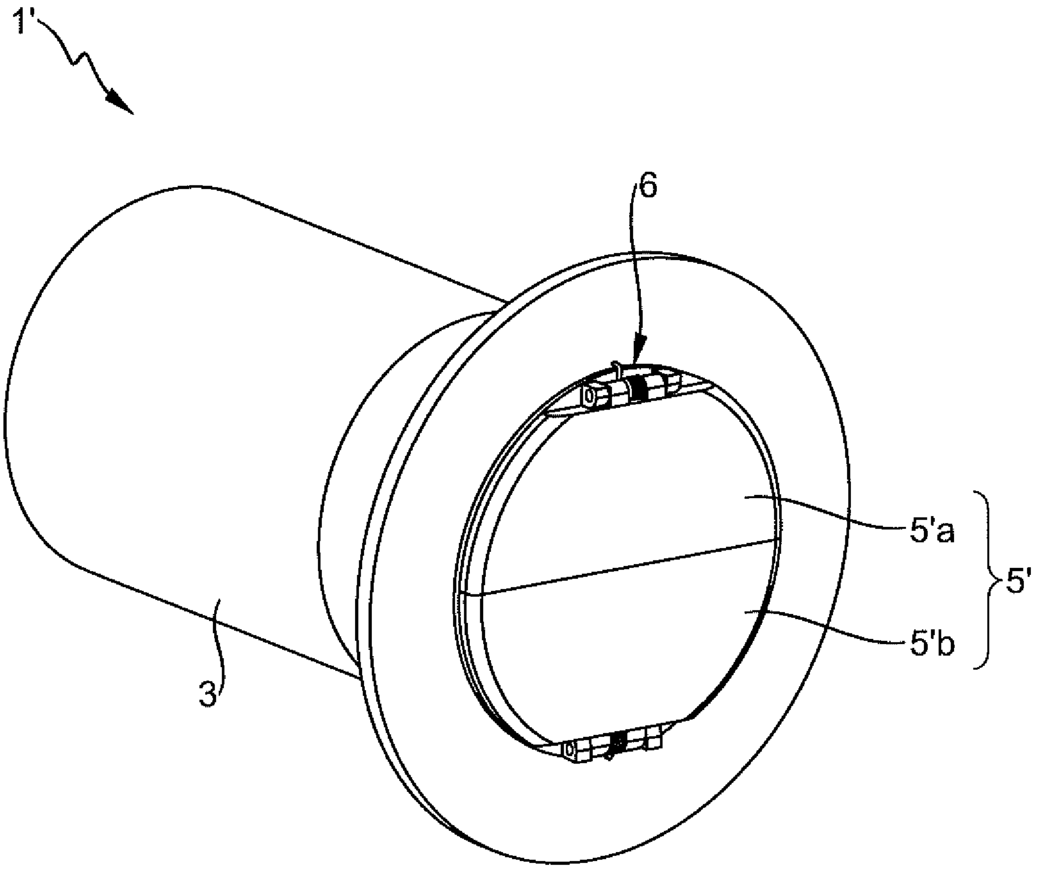
Figure 2B:
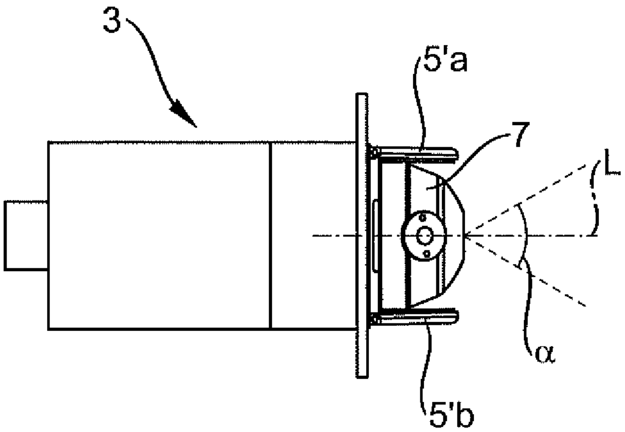

FIGS. 2*a, b* show an extinguishing nozzle adapter 1' according to a second exemplary embodiment of the invention. In terms of its main design features, the extinguishing nozzle adapter 1' corresponds to the extinguishing nozzle adapter 1 according to FIGS. 1*a-e*, and so only the distinguishing features will be discussed in the following text. Thus, in the extinguishing nozzle adapter 1', an alternative cover 5' is attached, which has a first cover element 5'*a* and a second cover element 5'*b*, which are each pivotably arranged as flaps on the housing 3, in order preferably to each be arranged on the housing 3 by means of corresponding restoring elements 6. The basic kinematic and displacement movement of the cover 5' by the extinguishing nozzle 7 while it is being moved into the advanced position (FIG. 2*b*) is the same as in the exemplary embodiment according to FIGS. 1*a-e*. The difference that is apparent in FIG. 2*b* is that the two covers 5'*a*, 5'*b* do not protrude as far from the housing 3 in the direction of the longitudinal axis L and so a larger opening angle $\alpha$ for the extinguishing agent outlets would be possible, or a smaller advancement would suffice in order for it to be possible to cover the same opening angle α as in the exemplary embodiment according to FIGS. 1*a-e*.

Figure 3:
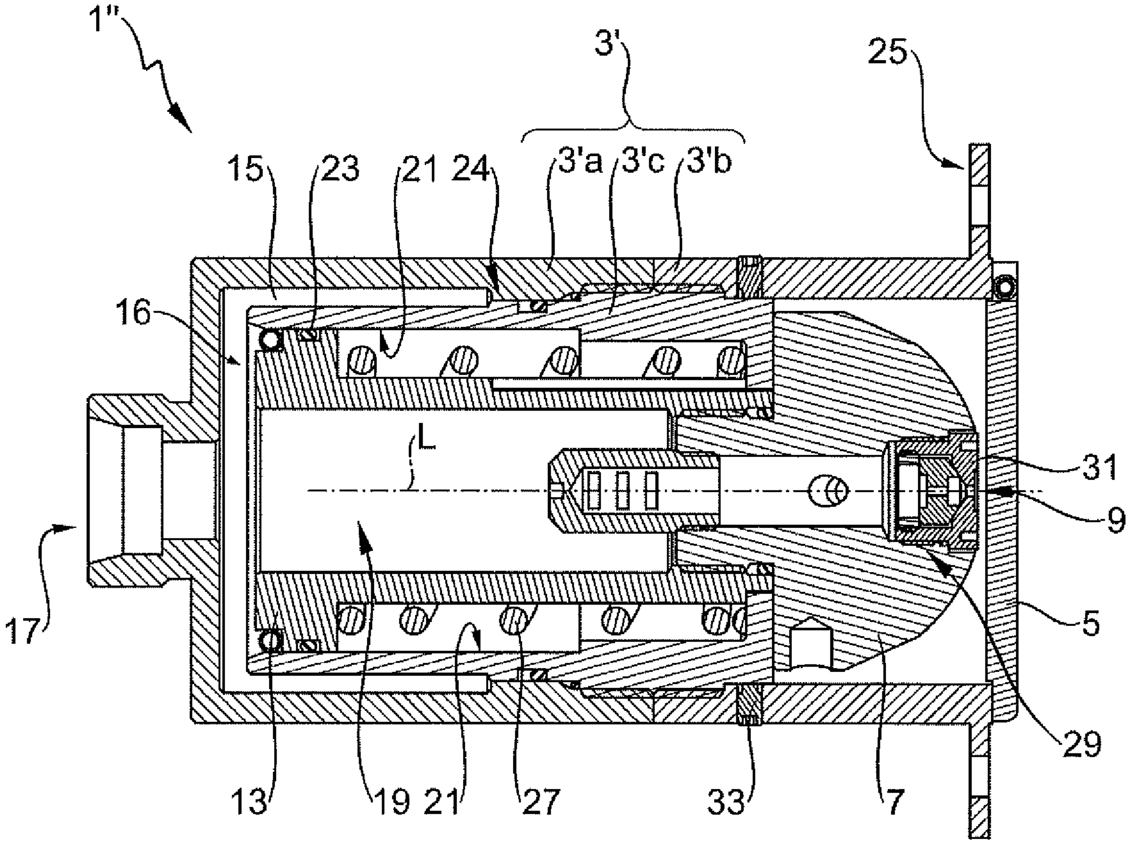
FIG. 3 shows an extinguishing nozzle adapter according to a third preferred exemplary embodiment.

While the housing was formed in two parts in the exemplary embodiments according to FIGS. 1*a-e* and 2*a, b*, in a third exemplary embodiment, which is shown in FIG. 3, the housing is formed in three parts. The housing 3' has a first housing part 3'*a*, which has the extinguishing agent inlet 17, and a second housing part 3'*b*, which has the cover 5. Furthermore, the housing 3' also has a third housing part 3'*c*, which bears the inner wall 21 in which the piston 13 is guided. Thus, the respective functional portions can be produced in subprocesses optimized separately therefor.

The first and second housing parts 3'*a*, 3'*b* are preferably screwed onto a corresponding thread of the third housing part 3'*c*. Preferably, one or both housing parts 3'*a*, 3'*b* can be additionally secured to the third housing part 3'*c* by means of corresponding securing elements 33, for example grub screws.

Figure 4:
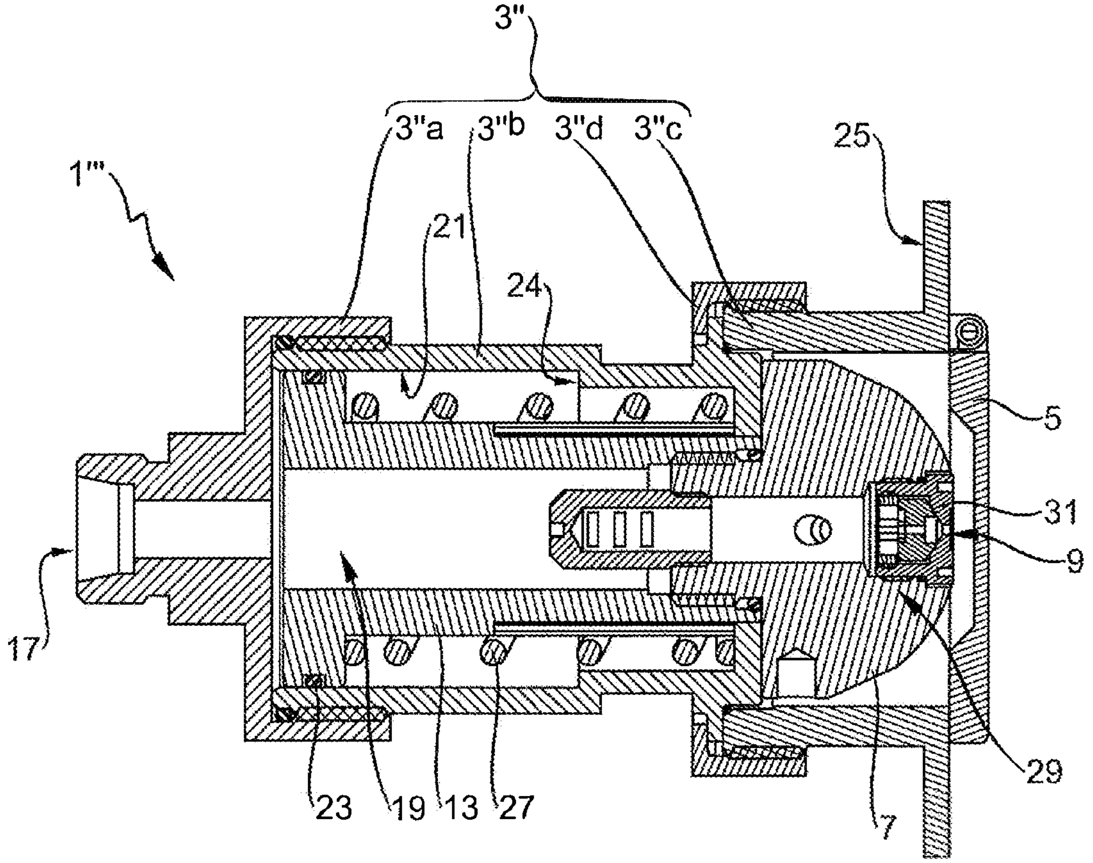
FIG. 4 shows an extinguishing nozzle adapter according to a fourth exemplary embodiment.

Beyond the illustration according to FIG. 3, a further exemplary embodiment is shown in FIG. 4, in which the housing 3" is formed in four parts. In addition to a first housing part 3"*a*, which has the extinguishing agent inlet 17, and a second housing part 3"*b*, which has the cover 5, and also a third housing part 3"*c*, in which the inner wall 21 for guiding the piston 13 is formed, the housing 3" comprises a fourth housing part 3"*d*, which is designed as a union nut in order to fasten the second housing part 3"*b* to the third housing part 3"*c*. The first housing part 3"*a* is connected to the third housing part 3"*c* by a separate thread.

Figure 5:
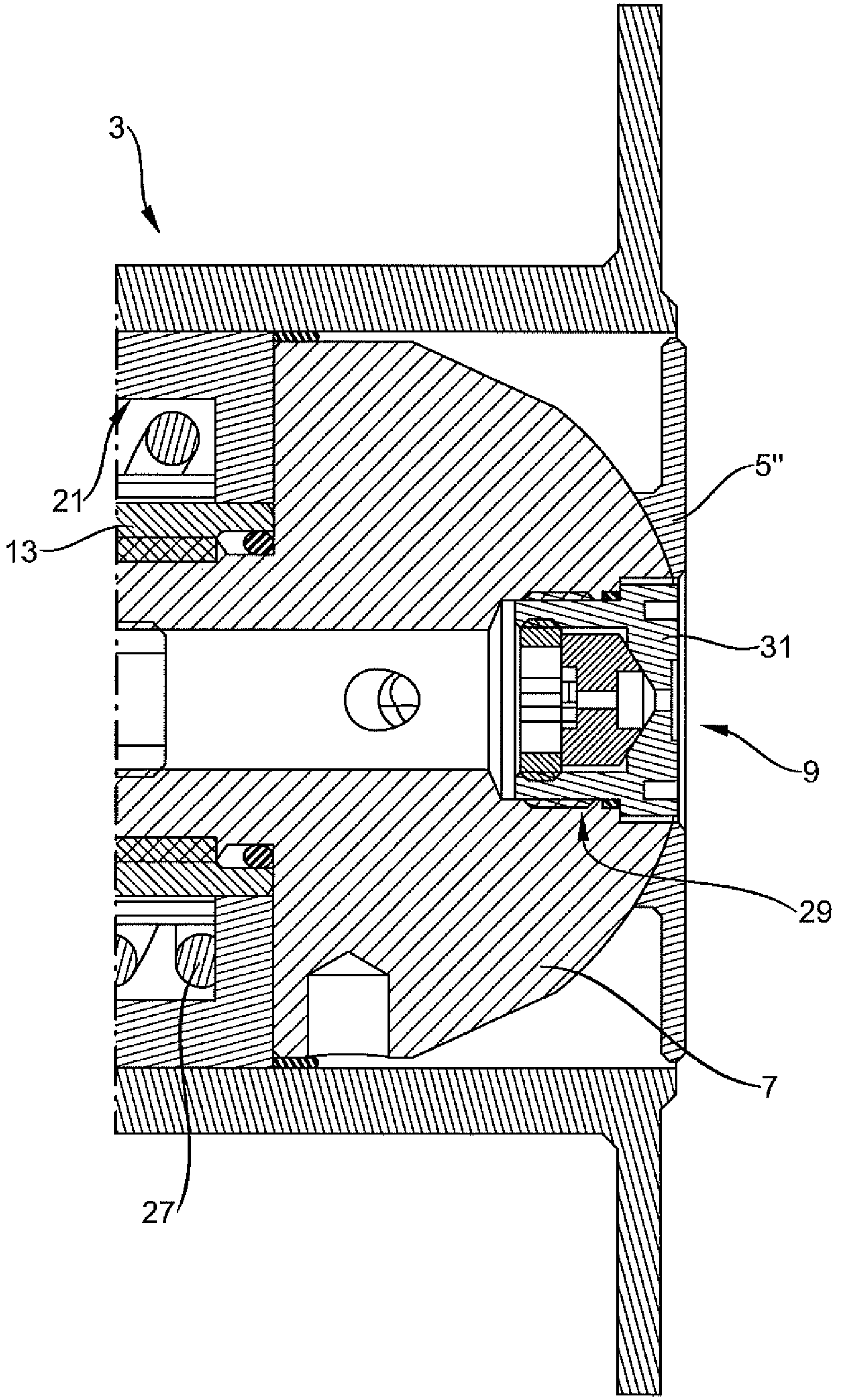
FIG. 5 shows an extinguishing nozzle adapter according to a fifth exemplary embodiment.
Figure 6C:
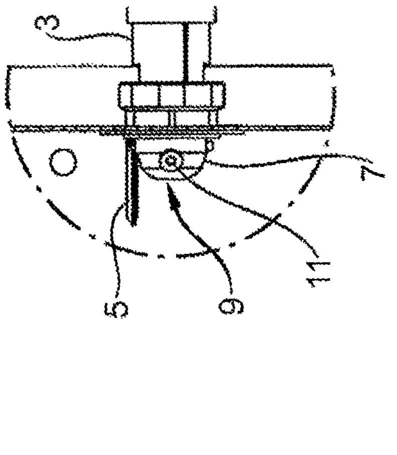
FIGS. 6*a-d* show a firefighting system having an extinguishing nozzle adapter according to FIGS. 1-5.
Figure 6D:
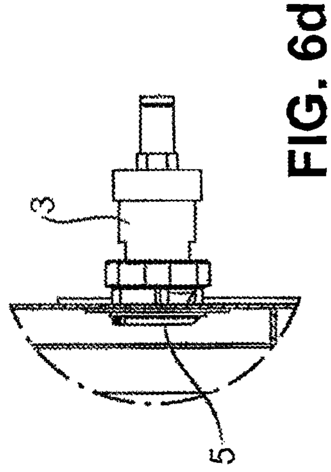
Figure 6A:
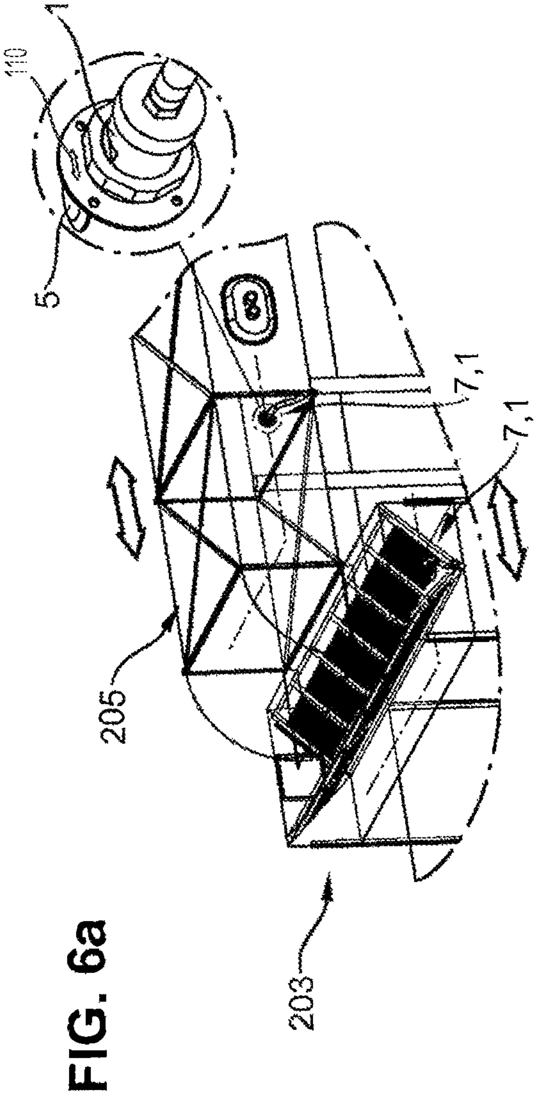
Figure 6B:
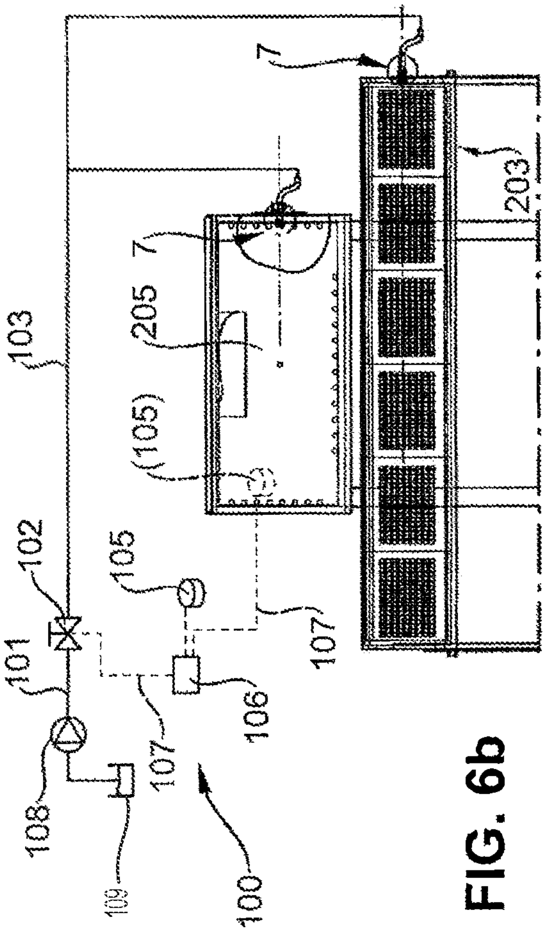

The exemplary embodiments in FIGS. 1-4 each have in common that the covers 5, 5' or covering elements 5'*a, b* were movable to a limited extent, but were otherwise arranged in a fixed position on the extinguishing nozzle adapter 1, 1', 1", and were each displaced by the advancing extinguishing nozzle 7. FIG. 5 shows a slightly modified preferred embodiment in which a cover 5" is fastened to the extinguishing nozzle 7. At that point at which the first extinguishing agent outlet 9 is arranged on the extinguishing nozzle 7, the cover 5" has a recess, through which the extinguishing agent can flow. The cover 5" is moved in translation, together with the head of the extinguishing nozzle 7, out of the first position and into the second position when the chamber inside the extinguishing nozzle 7 is pressurized.

As regards the otherwise identical manner of functioning and the otherwise identical functional structure, reference is made to the above exemplary embodiments.

FIGS. 1-5 each show an extinguishing nozzle adapter on its own.

FIG. 6 furthermore shows a firefighting system 100. The firefighting system 100 has a supply line 101 which is fed by an extinguishing agent source 109. Preferably, for this purpose, a pump 108 (or several) is provided, which are fluidically connected to the extinguishing agent supply 109 and convey extinguishing agent during operation into the supply line 101. Via a valve station 102, a line network 103, also known as a distribution network, is supplied with extinguishing agent. In the line network 103, one or more extinguishing nozzles 7 according to the present invention are installed.

The extinguishing nozzles 7 in the system illustrated here can be configured for example as sprinklers according to preferred embodiments of the invention. Such a firefighting system could be used for example as a sprinkler system in the roll-on/roll-off sector of ships. Alternatively, it is also possible to use the firefighting system 100 as a high-pressure spray mist nozzle system in buildings or for example for firefighting in exhaust air systems. For such a purpose, the firefighting system 100 is preferably also equipped with one or more fire characteristic detectors 105, wherein, according to the invention, a fire characteristic, in addition to the temperature, is understood also to be, for example, electromagnetic radiation, smoke aerosols or fire gases.

The detectors 105 are connected to a control center 106 in a signal-conducting manner via corresponding signal lines 107.

If the existence of a fire characteristic, or the exceeding of a representative threshold, is detected by one or more detectors 105, the control center 106 actuates the valve station 102 and causes the control valve arranged there to be opened, with the result that extinguishing fluid can pass into the line network 103 and to the extinguishing nozzles 7.

If the firefighting system 100 is operated as a sprinkler system, extinguishing fluid is usually also present in the line network in the closed state of the sprinklers.

The firefighting system 100 is intended for example for fighting fires at or in an extractor duct 205, for example an extractor duct for a cooking area. Functionally, at least one of the detectors 105 is arranged within the duct 205. The extinguishing nozzle adapters are preferably arranged in the duct 205 itself and/or in a hood portion 203, cf. FIG. 6*b*. If the extinguishing nozzles 7 within the extinguishing nozzle adapter 1 remain in the first, retracted position, an image as for example in FIG. 6*d* results. Here, the cover 5 is closed and air can flow through the extractor duct 205 or the hood 203 without being impaired by the extinguishing nozzle 7. If, however, a fire breaks out, extinguishing agent is discharged to the extinguishing nozzles 7, wherein the extinguishing nozzles 7 move out of the retracted position into the second, advanced position, cf. FIG. 6*c*. In this position, the extinguishing nozzles 7 protrude into the space to which they are assigned, in this case the extractor duct 205 or the hood 203, and can discharge extinguishing agent in the predefined orientation. After the discharging of extinguishing agent is complete, the extinguishing nozzles 7 travel, preferably automatically, back into the first, retracted position. The exemplary embodiment shown in FIGS. 6*a-d* applies for example to all of the extinguishing nozzle adapters 1, 1', 1" shown in FIGS. 1-5 and the manner of functioning is also transferable to other firefighting systems and other spaces which are not in the form of ducts.

The extinguishing nozzle adapter 1 can be installed on the wall of the extractor duct 205 or the hood 203 from the outside and be oriented as desired.

During operation of the inventive extinguishing nozzle adapter 1, or one of the extinguishing nozzle adapters 1', 1", 1'" according to FIGS. 1*a*-6*d*, essentially the following functional sequence is carried out: If a fire needs to be fought, pressurized extinguishing agent is introduced into the chamber 15 from the extinguishing fluid source 109 via the fluid inlet 17. As soon as the extinguishing agent pressure in the chamber is high enough for the restoring force of the return spring 27 to be able to be overcome, the piston 13 displaces the cover 5, as a result of the advancement of the extinguishing nozzle 7, from its closed position into an open position, and the extinguishing nozzle 7 is moved into its advanced position. Extinguishing agent can then be discharged, in a manner unimpeded by the cover 5, into the space on the wall of which the extinguishing agent nozzle adapters 1, or 1', 1" or 1'", are mounted.

LIST OF SELECT REFERENCE NUMBERS AND SKINS

1, 1', 1", 1'" Extinguishing nozzle adapter
3, 3', 3" Housing 3'*a,b,c* Housing parts
3"*a,b,c,d* Housing parts
5, 5" Cover
5*a*, 5'*a,b* Covering element
6 Restoring element
7 Extinguishing nozzle
8, 10 Knuckle
9 First extinguishing agent outlet
11 Second extinguishing agent outlet
12 Hinge pin
13 Piston
14 Extinguishing agent inlet, extinguishing nozzle
15 Chamber
16 Active face
17 Extinguishing agent connection
18 Extinguishing-nozzle-side end, chamber
19 Passage opening
21 Inner wall surface
23 Sealing element, piston
24 Stop
25 Mounting interface
27 Return spring
26, 28 Form-fitting element
29 Recess
33 Securing element
100 Firefighting system
101 Extinguishing fluid supply line
102 Valve station
103 Line network
105 Fire characteristic detector
106 Control center
107 Signal line
108 Pump
109 Extinguishing fluid source
110 Marking
111 Interior wall
L Longitudinal axis
α Opening angle

The invention claimed is:

1. An extinguishing nozzle adapter for mounting an extinguishing nozzle on a wall, comprising:

a housing defining a chamber extending along a longitudinal axis, the housing having an extinguishing agent connection to the chamber and an interior wall disposed within the chamber;

an extinguishing nozzle received within the chamber;

a piston disposed within the chamber, the piston having a passage opening in fluid communication with the extinguishing nozzle; and a spring disposed about the piston;

wherein via the extinguishing agent connection the chamber is able to be pressurized with extinguishing agent, wherein the chamber is designed to receive the extinguishing nozzle in a movable manner such that the extinguishing nozzle is movable back and forth between a first, retracted position and a second, advanced position, wherein, in the first, retracted position, the spring engages the piston and the interior wall so that the extinguishing nozzle abuts the interior wall, wherein the extinguishing nozzle is moved in a direction of the second, advanced position when the chamber is pressurized by the extinguishing agent and is located at the second, advanced position when the piston engages a stop positioned within the chamber between the interior wall and the extinguishing agent connection, wherein the chamber has an extinguishing nozzle side including an end enclosed by a cover, the extinguishing nozzle side of the chamber including a first form-fitting element including a first surface comprising a groove that cooperates with a second surface of a corresponding second form-fitting element comprising a protrusion protruding laterally from a head of the extinguishing nozzle and the first form-fitting element and the second form-fitting element are positioned between the interior wall and the cover to control an orientation of the extinguishing nozzle, and wherein the housing includes a mounting flange for fastening the extinguishing nozzle adapter to the wall, the mounting flange having a marking that is representative of the orientation of the extinguishing nozzle inside the housing.

2. The extinguishing nozzle adapter as claimed in claim 1, wherein the spring is operatively connected to the extinguishing nozzle and is biased in the direction of the retracted position of the extinguishing nozzle, and wherein a maximum diameter of the head of the extinguishing nozzle is greater than a maximum diameter of the spring.

3. The extinguishing nozzle adapter as claimed in claim 1, wherein the cover being designed to close the chamber when the extinguishing nozzle is in the retracted position and to open up the chamber when the extinguishing nozzle is in the advanced position.

4. The extinguishing nozzle adapter as claimed in claim 3, wherein the cover is arranged in the form of one or more covering elements on the housing so as to be pivotable between a closed position and an open position, and wherein the extinguishing nozzle is designed to force the cover from the closed position into the open position during its own movement in the direction of the advanced position, wherein a cover restoring spring is operatively connected to the cover and is designed to exert a restoring force in the direction of the closed position on the cover.

5. The extinguishing nozzle adapter as claimed in claim 3, wherein the cover is designed to be fastened to the extinguishing nozzle, and has at least one cutout for an extinguishing agent outlet of the extinguishing nozzle.

6. The extinguishing nozzle adapter as claimed in claim 2, wherein the piston is designed to be coupled to an extinguishing agent inlet of the extinguishing nozzle in order to fluidically connect the passage opening to the extinguishing nozzle.

7. The extinguishing nozzle adapter as claimed in claim 6, wherein the chamber has an inner wall surface along which the piston is slidably guided within the chamber between the extinguishing agent connection and the stop, and wherein a sealing element is arranged within a groove between the piston and the inner wall surface.

8. The extinguishing nozzle adapter as claimed in claim 6, wherein the spring comprises a first end connected to the interior wall of the housing and a second end connected to the piston.

9. The extinguishing nozzle adapter as claimed in claim 1, wherein the housing is configured in a multipart manner, and a first housing part has the extinguishing agent connection, positioned at a first terminal end of the extinguishing nozzle adapter, for introducing extinguishing agent into the chamber, and a second housing part has the cover positioned at a second terminal end of the extinguishing nozzle adapter.

10. The extinguishing nozzle adapter as claimed in claim 9, wherein the second housing part has the mounting flange.

11. The extinguishing nozzle adapter as claimed in claim 9, wherein the housing has a third housing part, which has an inner wall surface for guiding the piston.

12. A firefighting system for firefighting in a space bounded by a wall, having one or more extinguishing nozzles, which have been mounted in recesses in the wall from outside the space and are designed to introduce extinguishing agent into the space through the wall recess, wherein one, several or all of the extinguishing nozzles have been mounted on the wall by an extinguishing nozzle adapter having:

a housing defining a chamber extending along a longitudinal axis, the housing having an extinguishing agent connection to the chamber and an interior wall disposed within the chamber, an extinguishing nozzle received within the chamber, a piston disposed within the chamber, the piston having a passage opening in fluid communication with the extinguishing nozzle, and a spring disposed about the piston, wherein via the extinguishing agent connection the chamber is able to be pressurized with extinguishing agent, wherein the extinguishing nozzle is movable back and forth between a first, retracted position and a second, advanced position, wherein, in the first, retracted position, the spring engages the piston and the interior wall so that the extinguishing nozzle abuts the interior wall, wherein the extinguishing nozzle is moved in a direction of the advanced position when the chamber is pressurized by the extinguishing agent and is located at the second, advanced position when the piston engages a stop within the chamber that surrounds the spring, wherein the chamber has an extinguishing nozzle side including an end enclosed by a cover, the extinguishing nozzle side of the chamber including a first form-fitting element having a first surface comprising a groove that cooperates with a second surface of a corresponding second form-fitting element comprising a protrusion protruding laterally from a head of the extinguishing nozzle with the first form-fitting element and the second form-fitting element being positioned between the interior wall and the cover to control an orientation of the extinguishing nozzle, and wherein the housing includes a mounting flange for fastening the extinguishing nozzle adapter to the wall, the mounting flange having a marking that is representative of the orientation of the extinguishing nozzle inside the housing.

13. The firefighting system as claimed in claim 12, wherein the space comprises an extractor duct for gaseous mixtures of substances including ambient air and/or cooking fumes.

14. The extinguishing nozzle adapter as claimed in claim 7, wherein the stop extends toward the longitudinal axis transverse to the inner wall surface.

15. The extinguishing nozzle adapter as claimed in claim 7, wherein the stop is positioned between the interior wall and the extinguishing agent connection.

16. The extinguishing nozzle adapter as claimed in claim 11, wherein the housing has a fourth housing part configured to fasten the second housing part to the third housing part.

17. The extinguishing nozzle adapter as claimed in claim 4, wherein the cover is held in the open position by the extinguishing nozzle.

* * * * *